C. BRINTON.
FURNITURE-CASTER.
No. 171,981. Patented Jan. 11, 1876.
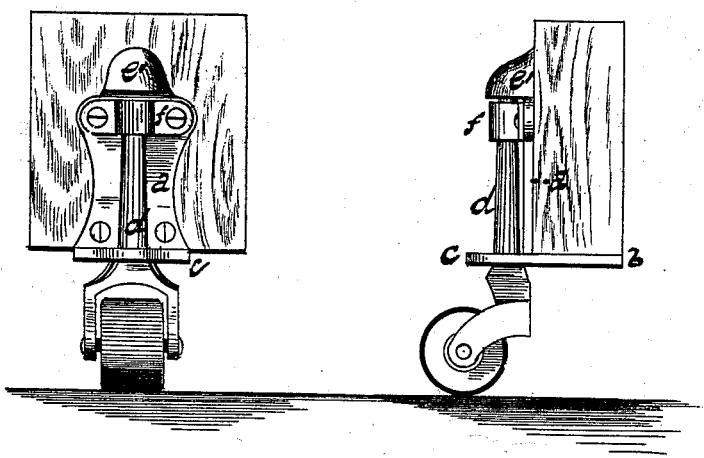
WITNESSES
John Pollow
Edw. S. Bill
INVENTOR
Caleb Brinton
By W. E. Simonds
Atty.

UNITED STATES PATENT OFFICE.

CALEB BRINTON, OF CHICAGO, ILLINOIS.

IMPROVEMENT IN FURNITURE-CASTERS.

Specification forming part of Letters Patent No. 171,981, dated January 11, 1876; application filed June 7, 1875.

CASE B.

*To all whom it may concern:*

Be it known that I, CALEB BRINTON, of Chicago, in the county of Cook and State of Illinois, have invented certain new and useful Improvements in Furniture-Casters, of which the following is a specification, reference being had to the accompanying drawings, where—

Figure 1 is a front view. Fig. 2 is a side view. Fig. 3 is a partial section. Fig. 4 is a perspective view of the caster adapted to the inside of a corner. Fig. 5 is a perspective view of the caster adapted to the outside of a corner.

The invention consists in a caster of peculiar construction, intended to be secured not into the bottom of a post, but the side of a piece of furniture, or to the inside or outside of the corner of the same. The body of the caster is in a single piece, preferably a casting having the upright or vertical part $a$, which fits against the upright or vertical side of the wood; the horizontal leaf $b$, which fits under the wood, the leaf $c$, which serves as a bearing for the pintle or spindle $d$, and the lug or cup-piece $e'$, having a cup-bearing underneath, into which fits the balled end $e$ of the pintle. The strap $f$ runs around the pintle, and is fastened to part $a$ by the same screws which secure part $a$ to the wood. The weight imposed on the caster rests wholly on the semispherical head $e$, and the pintle $d$ is kept from dropping down and out by the strap $f$, which is set underneath the head $e$.

In Figs. 1, 2, and 3 I show my improvement applied to a caster intended for the plain side of the wood, while in Fig. 4 I show the same applied to a caster for the inside of a corner, and in Fig. 5 applied to a caster for the outside of a corner.

In the manufacture of the caster, the hole for the bearing in the leaf $c$ and the cup-bearing are both drilled at one operation, the drill passing through leaf $c$ to do its work in the lug $e'$.

I claim as my invention—

The plate or body-piece $a\ b\ c$, perforated at $c$, and having the cup-bearing $e'$ cast or otherwise formed thereon, in combination with the pintle or spindle $d$, having semi-elliptical head $d'$, and the strap $f$, all constructed and arranged substantially as described and shown, for the purpose set forth.

CALEB BRINTON.

Witnesses:
WM. E. SIMONDS,
EDWD. S. BILL.